No. 665,859. Patented Jan. 15, 1901.
G. T. ALLEN.
COOKING UTENSIL.
(Application filed Sept. 15, 1899.)
(No Model.)

WITNESSES:
C. Elwood Bell.
M. G. McLean

INVENTOR.
George T. Allen,
BY Barr Deemer & Co
ATTORNEYS

THE NORRIS PETERS CO., PHOTO-LITHO., WASHINGTON, D. C.

UNITED STATES PATENT OFFICE.

GEORGE T. ALLEN, OF NEW YORK, N. Y.

COOKING UTENSIL.

SPECIFICATION forming part of Letters Patent No. 665,859, dated January 15, 1901.

Application filed September 15, 1899. Serial No. 730,596. (No model.)

*To all whom it may concern:*

Be it known that I, GEORGE T. ALLEN, a citizen of the United States, and a resident of New York city, county of New York, and State of New York, have invented certain new and useful Improvements in Cooking Utensils, of which the following is a specification, reference being had to the accompanying drawings, forming a part thereof, in which similar characters of reference indicate corresponding parts.

This invention relates to an improved cooking utensil; and the object thereof is to provide an article of this character which is so constructed as to be readily handled, opened, and closed without liability of the user being burned by escaping steam.

The device is simple in construction, durable, and inexpensive, and it is adapted to be normally maintained in a closed condition with its handle or bail in an upright position.

My invention consists in a cooking utensil having a bail connected thereto at a point considerably below its top, combined with a cover having projections extending from opposite sides, so as to catch over the bail, whereby the movement of the bail to either side carries the cover with it, so as to allow the contents of the vessel to be inspected without having to remove or lift the cover by hand, as will be more fully described hereinafter.

Figure 1:
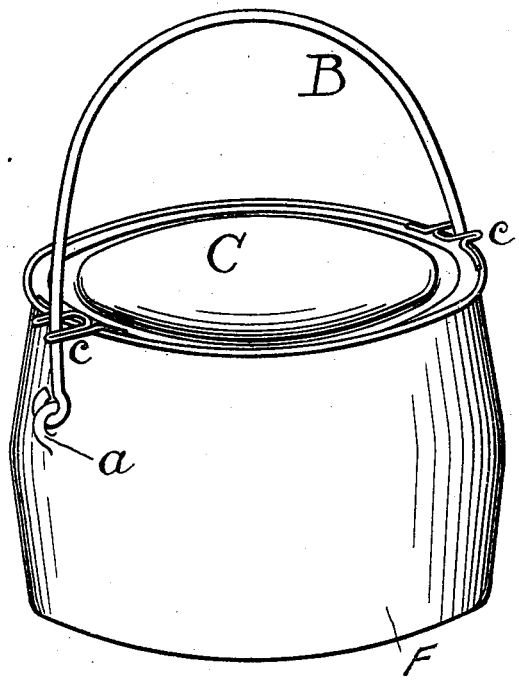
Figure 2:
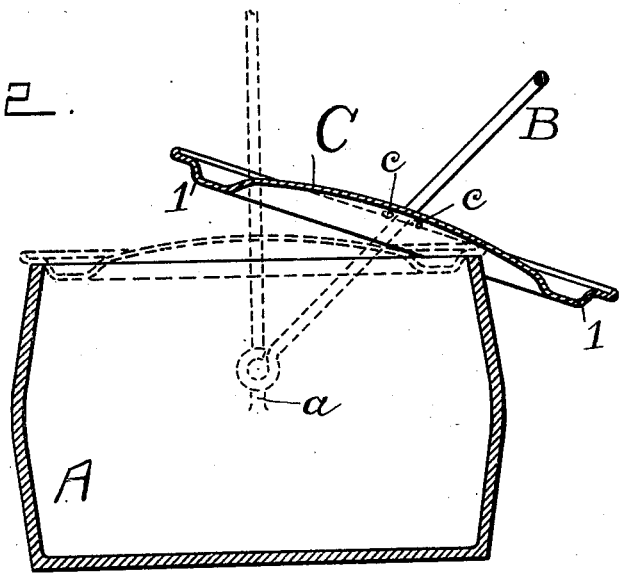

In the accompanying drawings, forming part of this specification, Figure 1 is a perspective view of my improved utensil, and Fig. 2 is a vertical sectional elevation thereof.

In the practice of my invention I employ, primarily, a vessel A, of adapted contour and proportions, composed of metal or other suitable material. Loosely swinging upon eyes $a$, located opposite to each other upon the outside of the vessel and near the center thereof, is a swinging bail or handle B. The eyes C are located near the center of the vessel for the purpose of allowing the handle to be used as a lever in contradistinction to attaching a bail to the vessel at its top edges, as is usually the case with cooking utensils of all kinds. This bail is maintained normally in an upright position, whereby it cannot rest upon the stove and be overheated, by means of forks $c$, which are projected outwardly from the lid C. This said lid is supplied with an annular depression 1, which engages the inner upper edge of the vessel A to prevent accidental lateral movement of the lid upon the vessel. The forks $c$ are located opposite to each other, and in the drawings they are made of wire soldered to the upper surface of the lid C; but it is obvious that these forks may form an integral part of the said lid, if desired.

In operation the forks $c$ normally embrace the bail B and maintain the said bail in an upright position while the utensil is being heated or while articles of food are being cooked therein; but when it is desired to open the lid for the purpose of inspecting the contents of the vessel it is simply necessary to swing the bail to one side, as illustrated by Fig. 2 of the drawings. This is done by handling the top part of the bail, and all ascending steam will leave the open side of the vessel and escape around the lid, which acts as a guard to prevent the steam from burning the hand of the person using the utensil. The bail is also used as a means for handling the vessel for the purpose of carrying it from place to place.

The bail is of sufficient height to admit of disengaging the lid therefrom by placing the said lid at an angle, thus permitting a user to thoroughly cleanse the device when desired. To entirely remove the lid, it is simply necessary to force the bail downwardly until the lid assumes an approximately upright position against the side of the vessel.

Having thus described my said invention, what I claim as new, and desire to secure by Letters Patent, is—

1. As a new article of manufacture, the combination with a cooking vessel and a non-resilient swinging bail, of a circular lid having a flat projecting edge, an annular shallow depression and oppositely-located forks, the shallow depression of the lid engaging the inner edge of the vessel, and the forks embracing the bail but not permanently connected therewith, whereby the bail can be used as a lever to move the lid back and forth and the lid can be detached from the bail when desired, substantially as shown and described.

2. As a new article of manufacture, the combination with a cooking vessel and a non-resilient swinging bail, of the lid C, having the flat projecting rim, the shallow annular projection L, having its outside wall, extended inwardly at an angle, and the forks c, which embrace the bail but are not permanently connected thereto, substantially as shown and described.

In testimony that I claim the foregoing as my invention I have signed my name, in presence of two witnesses, this 12th day of September, 1899.

GEORGE T. ALLEN.

Witnesses:
M. G. MACLEAN,
C. ELWOOD BELL.